(12) United States Patent
Yoshimura et al.

(10) Patent No.: US 9,811,177 B2
(45) Date of Patent: Nov. 7, 2017

(54) ELECTRONIC WRITING DEVICE

(71) Applicant: Brother Kogyo Kabushiki Kaisha, Nagoya-shi, Aichi-ken (JP)

(72) Inventors: Nako Yoshimura, Nagoya (JP); Yoshihiko Sugimura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 240 days.

(21) Appl. No.: 14/673,931

(22) Filed: Mar. 31, 2015

(65) Prior Publication Data

US 2015/0324020 A1 Nov. 12, 2015

(30) Foreign Application Priority Data

May 8, 2014 (JP) ................................. 2014-096819

(51) Int. Cl.
*G06F 3/033* (2013.01)
*G06F 3/0354* (2013.01)
*G06K 9/00* (2006.01)

(52) U.S. Cl.
CPC ........ *G06F 3/0354* (2013.01); *G06F 3/03545* (2013.01); *G06K 9/00416* (2013.01); *G06K 9/00442* (2013.01)

(58) Field of Classification Search
CPC .............. G06F 3/0354; G06F 3/03545; G06K 9/00416; G06K 9/00442
See application file for complete search history.

(56) References Cited

U.S. PATENT DOCUMENTS

2011/0285638 A1* 11/2011 Harris ................. G06F 3/04883
345/173
2013/0106801 A1* 5/2013 Kawai ................. G06F 3/04883
345/179

FOREIGN PATENT DOCUMENTS

JP 2001-147771 A 5/2001
JP 2013-025659 A 2/2013

* cited by examiner

*Primary Examiner* — Ilana Spar
*Assistant Examiner* — Brent D Castiaux
(74) *Attorney, Agent, or Firm* — Banner & Witcoff, Ltd.

(57) ABSTRACT

The disclosure discloses an electronic writing device comprising an image data specifying portion and a transmission control portion. The image data specifying portion configured to, in a case where a writing determining portion determines that the writing action has been performed, and further a entry determining portion determines that either one of a first storage instruction entry column included in a first page and a second storage instruction entry column included in a second page has been filled in, specify the image data in response to an entry mode in the either one of the storage instruction entry columns as a storage target in an external storage device. The transmission control portion controls a communication device triggered by the entry determining portion detecting entry in the storage instruction entry column to perform transmission for storing the image data specified as the storage target.

10 Claims, 7 Drawing Sheets

| | POSITION NUMBER | COORDINATE INFORMATION | |
|---|---|---|---|
| FIRST STROKE | T1 | X1 | Y1 |
| | T2 | X2 | Y2 |
| | T3 | X3 | Y3 |
| | T4 | X4 | Y4 |
| | T5 | X5 | Y5 |
| | T6 | X6 | Y6 |
| | T7 | X7 | Y7 |
| | T8 | X8 | Y8 |
| | T9 | X9 | Y9 |
| | T10 | X10 | Y10 |
| | T11 | X11 | Y11 |
| SECOND STROKE | T12 | X12 | Y12 |
| | T13 | X13 | Y13 |
| | T14 | X14 | Y14 |
| | T15 | X15 | Y15 |
| | T16 | X16 | Y16 |
| | T17 | X17 | Y17 |
| | T18 | X18 | Y18 |
| | T19 | X19 | Y19 |
| | T20 | X20 | Y20 |
| | T21 | X21 | Y21 |

| STROKE DATA | | "SAVE" CHECK | | SAVE DETERMINATION | | | SAVE RULES |
|---|---|---|---|---|---|---|---|
| LEFT PAGE | RIGHT PAGE | LEFT PAGE | RIGHT PAGE | LEFT PAGE | RIGHT PAGE | PATTERN | |
| O | O | O | | O | O | ① | IT IS DETERMINED THAT THE RIGHT PAGE (NEXT PAGE) IS FORGOTTEN TO BE CHECKED SINCE THE LEFT PAGE (PREVIOUS PAGE) IS CHECKED WITH DATA EXISTING IN THE RIGHT PAGE (NEXT PAGE). |
| O | X | O | | O | X | ② | IT IS DETERMINED THAT DATA EXISTS ONLY IN THE LEFT PAGE. |
| X | O | O | | X | O | ③ | IT IS DETERMINED THAT DATA EXISTS ONLY IN THE RIGHT PAGE. |
| X | X | O | | X | X | | SINCE NO DATA EXISTS IN BOTH PAGES, EMPTY DATA IS NOT TO BE SAVED. |
| O | O | | O | O | O | ④ | IT IS DETERMINED THAT DATA EXISTS OVER BOTH PAGES SINCE THE RIGHT PAGE (NEXT PAGE) IS CHECKED WITH DATA EXISTING IN THE LEFT PAGE (PREVIOUS PAGE). |
| O | X | | O | O | X | ② | IT IS DETERMINED THAT DATA EXISTS ONLY IN THE LEFT PAGE. |
| X | O | | O | X | O | ③ | IT IS DETERMINED THAT DATA EXISTS ONLY IN THE RIGHT PAGE. |
| X | X | | O | X | X | | SINCE NO DATA EXISTS IN BOTH PAGES, EMPTY DATA IS NOT TO BE SAVED. |

ELECTRONIC WRITING DEVICE

CROSS-REFERENCE TO RELATED APPLICATION

The present application claims priority from Japanese Patent Application No. 2014-96819, which was filed on May 8, 2014, the disclosure of which is incorporated herein by reference in its entirety.

BACKGROUND

Field

The present disclosure relates to an electronic writing device that turns written contents by an operator into electronic data.

Description of the Related Art

An electronic writing device (writing input device) is already known that turns contents written by an operator (user) using a writing instrument into electronic data. According to the prior art, medium to be written (plain paper) is placed on a holding means (stage of a hand-writing input portion). In this state, if the operator performs desired writing on the medium to be written using the writing instrument (electro-magnetic pen), a detection circuit of the hand-writing input portion detects positional information about the writing instrument, and data (added writing data) corresponding to the writing contents on the medium to be written is created based on a plurality of pieces of the positional information. When a writing operation is finished, the data corresponding to the writing contents on the medium to be written is transmitted to and saved in an external storage device (personal computer) via a communication interface.

If the medium to be written is a right and left two-page spread type when the written contents are turned into electronic data as described above, in a case where an operator adds writing on only either one page, or in a case where an operator adds writing on both right and left pages, it is very convenient if the writing contents turned into electronic data can be saved in a page unit intended by the operator, or if the writing contents writing contents turned into electronic data can be automatically saved depending on whether writing in a page unit has been added so as not to forget to save one page while another one page has been saved. However, according to the prior art, consideration was not particularly given to storage processing for each page of the medium to be written in a spread state.

SUMMARY

An object of the present disclosure is to provide an electronic writing device that can estimate an operator's intention, and adequately specify and store image data to be stored so as to improve operator's convenience based on whether or not the image data corresponding to each page exists, even when the operator has entered only one of storage instruction entry columns of spread two pages.

In order to achieve the above-described object, according to the aspect of the present application, there is provided an electronic writing device comprising a position acquiring portion configured to acquire a plurality of pieces of positional information about a writing instrument that moves along with a writing action performed by an operator on a medium to be written using the writing instrument, a data creating portion configured to create image data corresponding to writing contents on the medium to be written with the writing instrument using the plurality of pieces of positional information acquired by the position acquiring portion, a communication device configured to transmit the image data created by the data creating portion so as to be stored in an external storage device via communication, a holding member configured to hold the medium to be written including a storage instruction entry column for instructing storage in the external storage device in each page in a spread state of a first page on a first side and a second page on a second side in a horizontal direction, a writing determining portion configured to determine whether or not the writing action has been performed by the operator on each of the first page and the second page of the medium to be written held by the holding member, based on an acquisition result by the position acquiring portion, an entry determining portion configured to determine whether or not the storage instruction entry column included in each page of the medium to be written held by the holding member has been filled in, based on the acquisition result by the position acquiring portion, an image data specifying portion configured to, in a case where the writing determining portion determines that the writing action has been performed on at least one of the first page and the second page, and further the entry determining portion determines that either one of a first storage instruction entry column included in the first page and a second storage instruction entry column included in the second page has been filled in, specify the image data based on the positional information corresponding to the writing action performed on the at least one page in a unit of one page or two pages in response to an entry mode in the either one of the storage instruction entry columns as a storage target in the external storage device, and a transmission control portion configured to control the communication device triggered by the entry determining portion detecting entry in the storage instruction entry column to perform transmission for storing the image data specified by the image data specifying portion as the storage target, in the external storage device.

DETAILED DESCRIPTION OF THE PREFERRED EMBODIMENTS

With reference to drawings, an embodiment of the present disclosure will be described below.

<System Outline>

Figure 1:
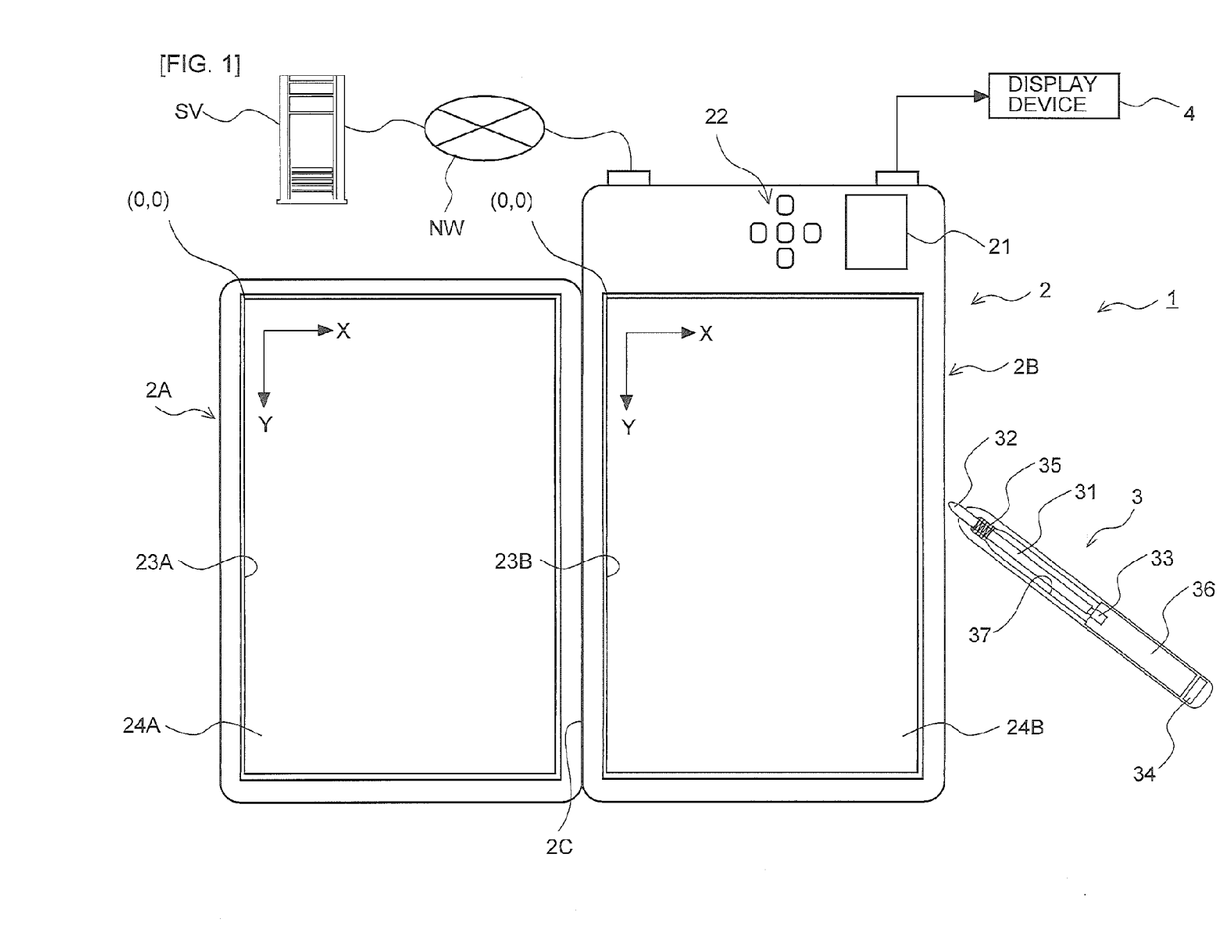
FIG. 1 is a system configuration diagram illustrating a whole configuration of a hand-writing input system including an electronic writing device according to an embodiment of the present disclosure.

FIG. 1 illustrates a hand-writing input system 1 including an electronic writing device 2 according to the present embodiment. In the description described below, an upper side, a lower side, a right side, a left side, a front side, and a depth side of a paper surface illustrated in FIG. 1 are defined as an upper side, a lower side, a right side, a left side, a front side, and a depth side of the electronic writing device 2.

As illustrated in FIG. 1, the hand-writing input system 1 includes the electronic writing device 2, an electronic pen 3 (writing instrument) of so-called electro-magnetic induction type, and a display device 4. According to the example, for example, the electronic writing device 2 is connected to a server SV functioning as the external storage device via a network NW by wireless (or wired) communication.

<Electronic Writing Device 2>

The electronic writing device 2 is a right and left page spread type having a long-thin cuboid shape in a vertical direction in a planar view, and includes a left side (first side) 2A, and a right side (second side) 2B in its spread state, and a hinge portion (holding member) 2C that holds the left side 2A and the right side 2B in the spread state in such a manner to be opened and closed.

At a front side (in the spread state) of the left side 2A of the electronic writing device 2, a placing portion 23A in a recessed shape is disposed in such a manner to cover almost the front side.

At an upper right portion of the right side 2B of the electronic writing device 2, a compact display portion 21 capable of displaying various types of information is disposed. Further, at a left side of the display portion 21 on the right side 2B, an input portion 22 via which a user operates the electronic writing device 2 is disposed. At a lower side of the display portion 21 and the input portion 22, the placing portion 23B in a recessed shape is disposed in such a manner to cover almost the front side (in the spread state) of the electronic writing device 2.

Paper medium 70 (refer to FIG. 5 described below) as the medium to be written is placed on each of the placing portions 23A, 23B (hereinafter, also referred to as "placing portion 23" including both the right and left portions), and further coordinate detection portions 24A, 24B (hereinafter, also referred to as "coordinate detection portion 24" including the right and left portions) are disposed in such a manner to cover substantially same areas as those of the placing portions 23A, 23B.

The coordinate detection portions 24A, 24B detect coordinate information (e.g., each upper left portion of the placing portions 23A, 23B is defined as an origin (0, 0)) indicating a position of an electronic pen 3. When the paper medium 70 is adequately placed on the left side 2A and the right side 2B, the placing positions 23A, 23B can be used as the left page (first page) 70A and the right page (second page) 70B. At this point, each of the right and left placing portions 23 is held in a posture in which an upper-left corner portion of the paper medium 70 placed on each of the placing portions 23 coincides with the origin (0, 0).

<Electronic Pen 3>

According to the description below, in the electronic pen 3, a direction in which a pen tip 32 of a core 31 is disposed is referred to as a tip end direction. Further, an opposite direction of the tip end direction is referred to as a rear end direction. The electronic pen 3 includes, according to the example, the core 31, a detection switch 33, a battery 34 of a button type, a coil 35, and a substrate 36. The core 31 is made of metal, and includes a pen tip 32 and an ink storage portion 37. Further, the core 31 is disposed inside the tip end portion of the electronic pen 3, and the pen tip 32 protrudes outside. Ink is stored in the ink storage portion 37, and supplied to the pen tip 32. With this configuration, the user (operator) can write desired letters and figures on the paper medium 70 using the electronic pen 3.

In a rear end direction of the core 31, the substrate 36 is disposed. At the tip end portion of the substrate 36, the detection switch 33 is mounted. In the rear end direction of the substrate 36, a battery 34 is disposed. The battery 34 is connected to the substrate 36. An electrode of the battery 34 at a minus side is electrically connected to a coil 35 via wiring on the substrate 36. Further, an electrode of the battery 34 at a plus side is electrically connected to a detection switch 33 via the wiring on the substrate 36. The detection switch 33 is electrically connected to the coil 35 via the wiring on the substrate 36. The coil 35 is wound around the core 31 at the tip end portion inside the electronic pen 3.

<Detection of Coordinate Information about Electronic Pen 3>

The core 31 is always urged in the tip end direction by an elastic member (not illustrated). The core 31 is slightly recessed inside the electronic pen 3 against an urging force of the elastic member by a pressing force when the user writes letters on the paper medium 70. Due to the recession, a rear end portion of the core 31 presses the detection switch 33 to turn on the detection switch 33. With this processing, the battery 34 and the coil 35 are conducted with each other and a current flows from the battery 34 to the coil 35, and thus a magnetic field is generated by the current flowing through the coil 35.

The coordinate detection portion 24 of the electronic writing device 2 detects a magnetic field generated from the coil 35 based on electro-magnetic induction as described above. Since this detection can be realized by a known method, details are not described herein. Based on a detection result of the coordinate detection portion 24, the CPU 201 acquires a plurality of pieces of positional information (i.e., the coordinate information) corresponding to a movement of the electronic pen 3 when the user performs the writing action on the paper medium 70 using the electronic pen 3. As described above, the present embodiment uses a coordinate system in which a coordinate (X, Y) at the upper left portion of the coordinate detection portion 24 is defined as an origin (0, 0), and a rightward direction is defined as an X axis and a downward direction is defined as a Y axis. More specifically, a value of the X coordinate indicates a position in a horizontal direction on the coordinate detection portion 24 (placing portion 23) and a value of the Y axis indicates a position in a vertical direction.

<Display Device 4>

The display device 4 is connected to the electronic writing device 2, and can display the image data corresponding to an outer appearance of the paper medium 70 placed by the user on the placing portion 23 of the electronic writing device 2 and the image data (assembly of stroke data) corresponding to the writing contents on the paper medium 70 written by the user.

<Electrical Configuration of Electronic Writing Device 2>

Figure 2:
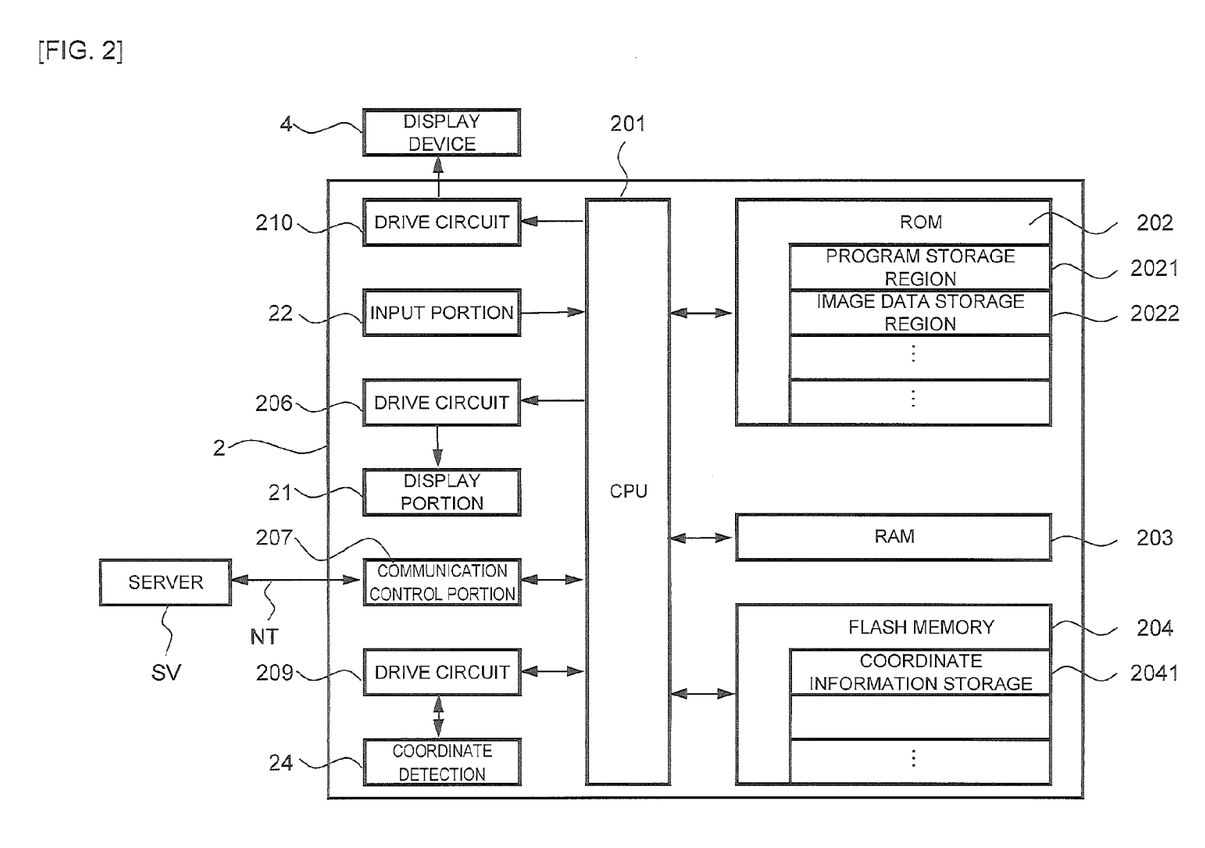
FIG. 2 is a functional block diagram illustrating an electric configuration of the electronic writing device.

With reference to FIG. 2, an electric configuration of the electronic writing device 2 will be described. As illustrated in FIG. 2, the electronic writing device 2 includes a CPU 201, a ROM 202, a RAM 203, a flash memory 204, an input portion 22, drive circuits 206, 209, 210, and a communication control portion 207 (communication device). The communication control portion 207 controls transmission and reception of information between the electronic writing device 2 and a server SV via a network NW.

The ROM 202, the RAM 203, and the flash memory 204 are electrically connected to the CPU 201. The ROM 202 includes a program storage region 2021 and an image data storage region 2023. The program storage region 2021 stores each type of program to be executed by the CPU 201 to control the electronic writing device 2. The image data storage region 2023 stores the image data corresponding to format information about the paper medium 70 described below.

The RAM 203 is used as a storage region temporarily storing various types of data. The flash memory 204 includes a coordinate information storage region 2041. The coordinate information storage region 2041 stores a coordinate information data table 53.

The input portion 22 and the drive circuits 206, 209, 210 are electrically connected to the CPU 201. The drive circuits 206, 209 are electronic circuits for driving the display portion 21 and the coordinate detection portion 24, respectively. The drive circuit 210 is an electronic circuit for causing the display device 4 to display an image.

<Creation of Stroke Data>

Figure 3:
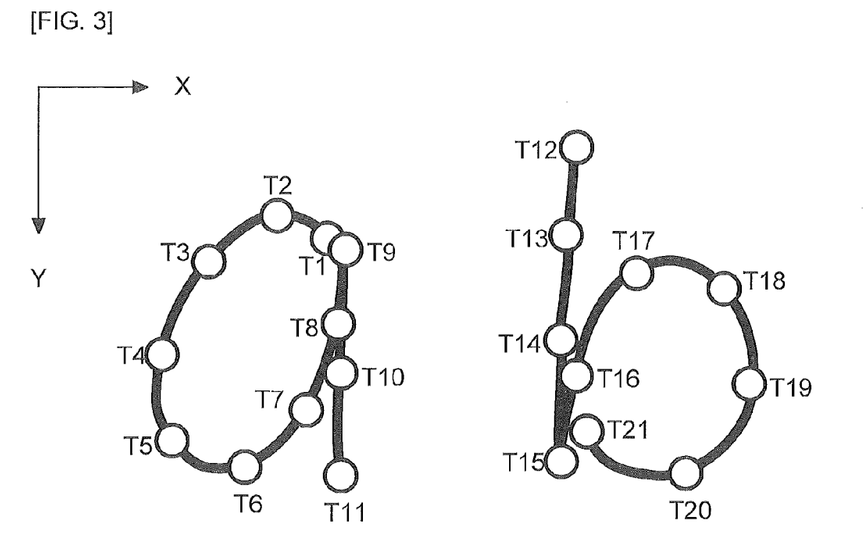
FIG. 3 is an explanatory diagram illustrating an example of acquiring stroke data.
Figure 4:
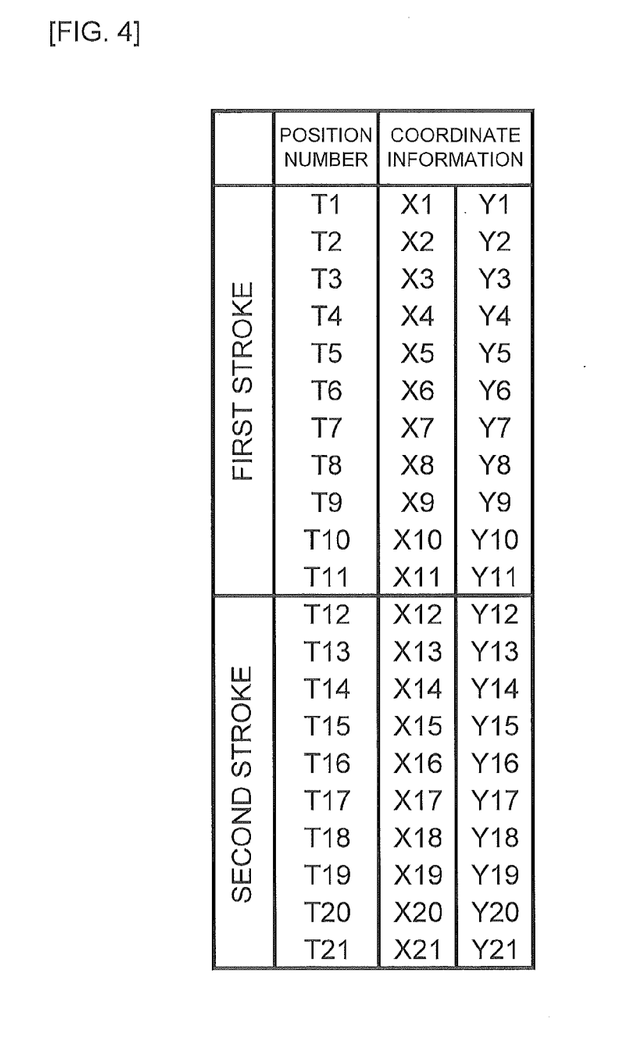
FIG. 4 is an explanatory diagram illustrating an example in which a pen position number and coordinate information in the stroke data are associated with each other.

Subsequently, the stroke data will be described. The stroke data is a pen position data string including a plurality of pieces of coordination information acquired by the CPU 201 based on a detection result of the coordinate detection portion 24. FIGS. 3, 4 illustrate examples of two types of stroke data "a" and "b".

As illustrated in FIGS. 3, 4, first stroke data "a" indicates a track of one stroke part from beginning to ending of writing of the letter "a" by the electronic pen 3. The first stroke data "a" includes 11 pieces of the coordinate information (X1, Y1), (X2, Y2), . . . , (X11, Y11) respectively corresponding to pen position numbers T1, T2, . . . T11 in chronological order. Further, the second strode data "b" indicates a track of one strode part from beginning to ending of writing of the letter "b" with the electronic pen 3. The second stroke data "b" includes 10 pieces of the coordinate information (X12, Y12), (X13, Y13), . . . , (X21, Y21) respectively corresponding to pen position numbers T12, T13, . . . T21 in chronological order. As described above, the CPU 201 creates the stroke data corresponding to the contents written by the user on the paper medium 70 with the electronic pen 3 using the plurality of pieces of the coordinate information corresponding to the detection result of the coordinate detection portion 24. The assembly of the plurality of pieces of the stroke data created as described above corresponds to the image data described in each claim.

<Features of the Present Embodiment>

In the basic configuration described above, the features according to the present embodiment is that, by user's checking a check box (described below) of the paper medium 70, storage processing is automatically performed on the stroke data corresponding to the actual writing on the paper medium 70 with the electronic pen 3 into a plurality of folders (storage destination) in the server SV corresponding to the writing state in a page unit. Details will be sequentially described below.

Figure 5:
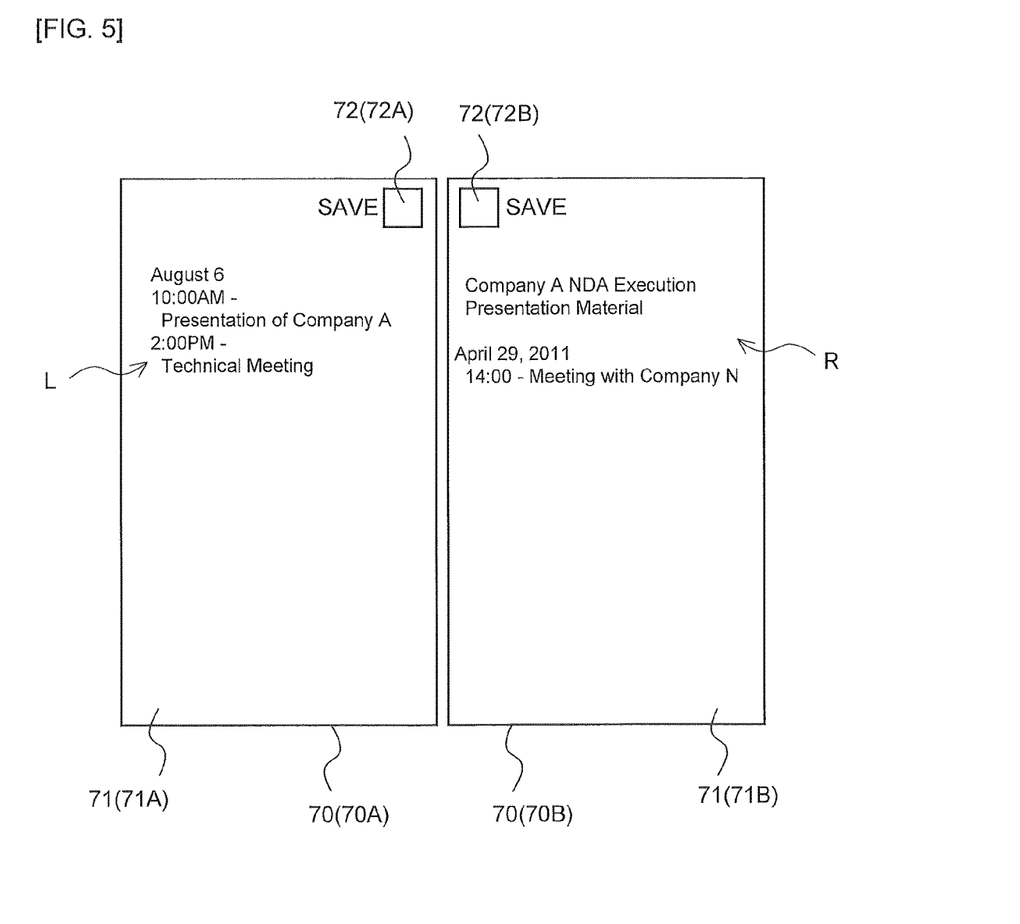
FIG. 5 is an explanatory diagram illustrating an example of a format (style) of paper medium.

FIG. 5 illustrates an example of the paper medium 70 used in the present embodiment. According to the example, a left page 70A includes a free writing region 71A where the user can freely write desired letters and figures (hereinafter, referred to also as "writing letter") L, and a "save" check box 72A functioning as the storage instruction entry column (first storage instruction entry column) positioned near the upper end portion of the left page 70A. Similarly, a right page 70B includes a free writing region 71B where the user can freely write desired writing letter R, and a "save" check box 72B functioning as the storage instruction entry column (second storage instruction entry column) positioned near the upper end portion of the right page 70B. Scale notation (for the sake of the description) indicating values of the X coordinate and the Y coordinate described above is also indicated in FIG. 5.

According to the example, as a folder that can be used by the user as a storage destination of the stroke data, a storage folder of the image data is disposed in the server SV. The paper medium 70 is previously set into a format corresponding to the storage folder and, as described above, the "save" check box 72 (72A, 72B) is disposed therein. At this point, when the left page 70A and the right page 70B are adequately placed on the placing portions 23A, 23B, respectively in the spread state in an upward direction (in the vertical direction), each check box 72 is positioned inside with respect to each other. With this arrangement, positional shift can be easily, visually recognized when the left page 70A and the right page 70B are placed on the placing portions 23A, 23B, respectively, and thus the positional shift can be suppressed.

In a state where the paper medium 70 is placed on the placing portion 23 of the electronic writing device 2, if the user enters a check mark in the "save" check box 72 of the paper medium 70 using the electronic pen 3, the stroke data corresponding to the check action is acquired by the CPU 201 within a coordinate value range corresponding to the "save" check box 72. With reference to previously stored format information, the CPU 201 recognizes that the "save" check box 72 is checked. The user, by checking the "save" check box 72, can instruct execution of transmission and saving of the stroke data corresponding to the writing letters L, R into free writing regions 71 (71A, 71B) to the storage destination (folder) in the server SV. Similarly, when only the "save" check box 72B of the right page 70B is checked, collective storage processing is performed on both the right and left pages as a mass of image data.

Further, in a case where only the left page 70A includes the image data, when only either one of the "save" check box 72 (72A, 72B) of the left page 70A and the right page 70B is checked, the storage processing is performed on the image data on the left page 70A including the image data. On the other hand, in the case where only the right page 70B includes the image data, when only either one of the "save" check box 72 (72A, 72B) of the right page 70B and the left page 70A is checked, the storage processing is performed on the image data on the right page 70B including the image data.

Furthermore, in a case where both the left page 70A and the right page 70B include no image data, even if either one of the "save" check boxes 72 of the left page 70A and the right page 70B is checked, the storage processing is not performed on the image data.

<Control Flow>

Figure 6:
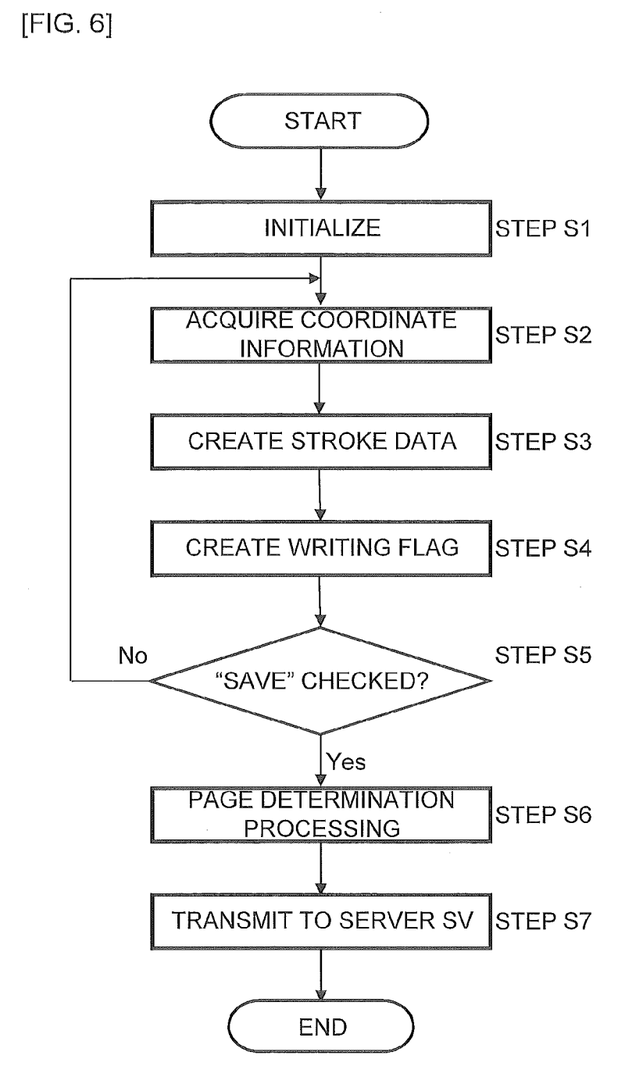
FIG. 6 is a flowchart illustrating control procedure executed by a CPU.

To realize the above described processing, a control procedure executed by the CPU 201 of the electronic writing device 2 will be described with reference to FIG. 6.

First, in Step S1, for example, the CPU 201 performs predetermined initialization triggered by a power of the electronic writing device 2 being turned on and then proceeds to Step S2.

In Step S2, based on the detection result by the coordinate detection portion 24 when the user performs writing as described above, the CPU 201 acquires the coordinate information about the electronic pen 3. The procedure functions as a position acquiring portion described in each claim.

Subsequently, the CPU 201 proceeds to Step S3, and based on the coordinate information acquired in Step S2, creates the stroke data corresponding to the contents of the letters L, R written by the user as described above. The procedure functions as a data creating portion described in each claim. The created stroke data is temporarily stored in the RAM 203.

In Step S4, based on the coordinate information acquired in Step S2, the CPU 201 determines that the writing has been performed corresponding to corresponding pages (70A, 70B) where the coordination information has been acquired, and then sets the writing flag (writing flag=1) so as to correspond to the corresponding pages (70A, 70B). The Step S4 functions as a writing determining portion described in each claim.

In Step S5, based on the coordinate information acquired in Step S2 and the stroke data created in Step S3, the CPU 201 determines whether the "save" check box 72 included in the paper medium 70 has been checked. In a case where the "save" check box 72 has been checked, the determination is satisfied (YES in Step S5), and the processing proceeds to Step S6. The Step S5 functions as an entry determining portion described in each claim.

On the other hand, in Step S5, in the case where the "save" check box 72 is not checked, the determination in Step S5 is not satisfied (NO in Step S5), and the processing loops to Step S2. Subsequently, until the "save" check box 72 is checked, a routine from Step S2 to Step S5 described above is repeated.

In Step S6, based on the flag set in Step S4, the CPU 201 executes page determination processing, and proceeds to Step S7. The Step S6 functions as an image data specifying portion described in each claim.

In Step S7, the CPU 201 controls the communication control portion 207, and stores and saves the image data in the folder in a page save mode (save determination pattern) determined in Step S6 via the network NW. The Step S7 functions as a transmission control portion described in each claim. Subsequently, the flow is ended.

Figure 7:
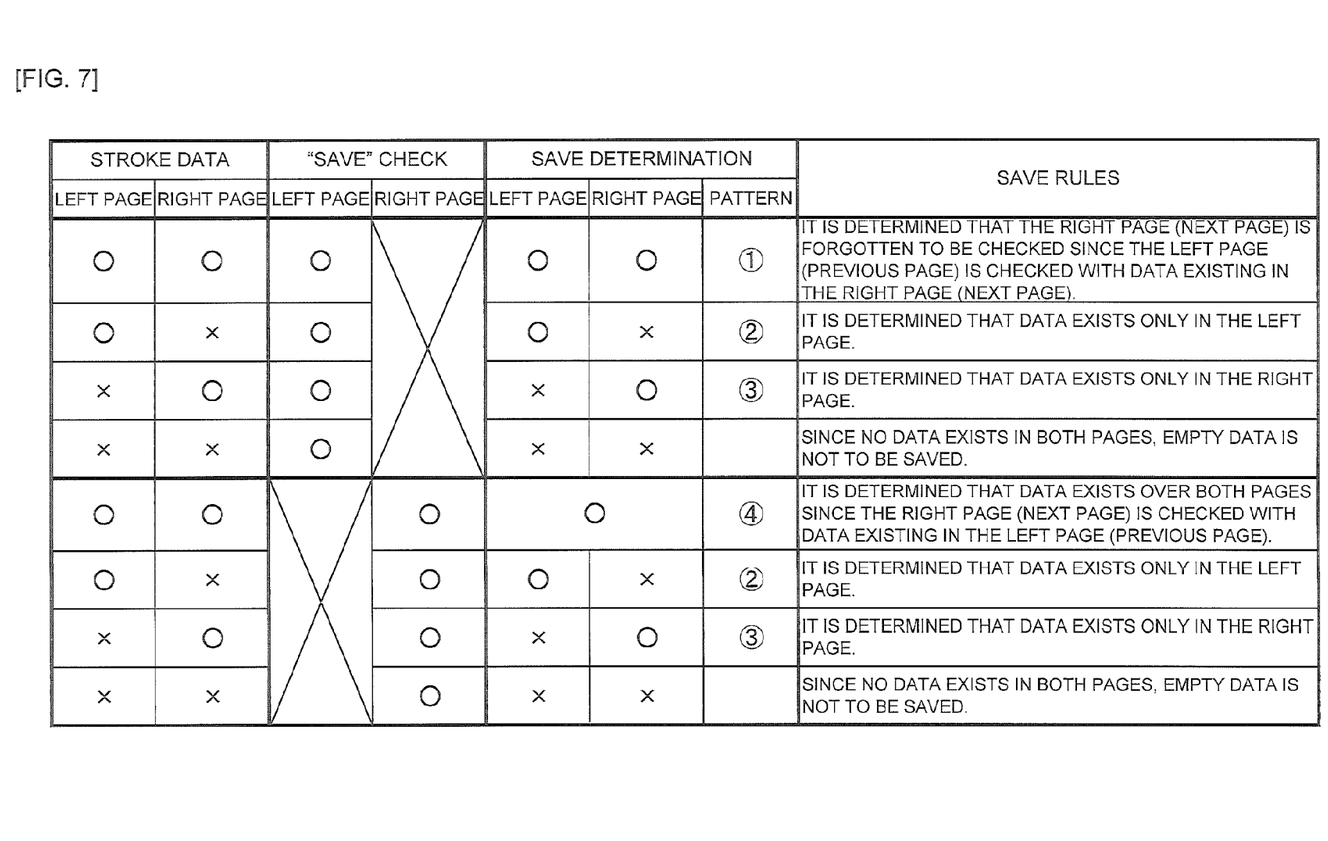
FIG. 7 is an explanatory diagram illustrating an example in which the stroke data in a page unit is saved based on whether or not the image data corresponding to each page exists.

FIG. 7 illustrates one example of the determinations by the CPU 201 in Step S6. For example, the determinations are stored in a form of a table in the ROM 202. The CPU 201 refers to this table, estimates an operator's intention based on whether or not the image data corresponding to each page (70A, 70B) exists (writing flag=1), adequately specifies the image data of a storage target, and then stores it in the server SV (Step S7).

In other words, the CPU 201 includes the writing determining portion (Step S4) and the image data specifying portion (Step S6) in addition to the entry determining portion (Step S5). Based on a position acquisition result by the position acquiring portion (Step S2), the writing determining portion (Step S4) determines whether or not the writing action has been performed on each of the left page 70A and the right page 70B. In a case where the writing action has been performed, it is defined as "writing flag=1" corresponding to the corresponding pages 70A, 70B.

If it is determined that the writing action has been performed on at least one of the left page 70A and the right page 70B, corresponding to the determination (determination that any one of each "save" check box 72 of the left page 70A and the right page 70B has been filled in) by the entry determining portion (Step S5), the image data corresponding to the writing action is specified as a storage target into the server SV in a page unit (or two-page unit) in response to the entry mode into either one of the "save" check boxes 72.

More specifically, for example, in a case where the writing action has been performed on the both pages of the left page 70A and the right page 70B, and further only the "save" check box 72A has been filled in, it is regarded that, when the writing action has been performed in order of the right page 70B to the left page 70A, the "save" check box 72B has been failed to be filled in after the "save" check box 72A has been filled in. Thus, the image data corresponding to each of the both pages is specified as the storage target. At this point, it is regarded that the "save" check boxes 72A, 72B of the both pages of the left page 70A and the right page 70B should have been otherwise filled in (the user has desired to store the data of the both pages individually), and thus the data thereof is specified as the storage target separately (save determination pattern 1).

Further, for example, in a case where the writing action has been performed on the both pages of the left page 70A and the right page 70B, and further only the "save" check box 72B has been filled in, it is regarded that, when the writing action has been performed in order of the left page 70A to the right page 70B, the user has had an intention for collectively storing the data of the both pages. Thus, the image data corresponding to each of the both pages is collectively specified as the storage target (save determination pattern 4).

Furthermore, in a case where the writing action has been performed only on the left page 70A (no writing action has been performed on the right page 70B), and further only the "save" check box 72A (or only the "save" check box 72B) has been filled in, it is regarded that the user has had an intention for storing the data on the left page 70A on which he/she has performed the writing action. Thus, only the image data corresponding to the left page 70A is specified as the storage target (save determination pattern 2).

Moreover, for example, in a case where the writing action has been performed only on the right page 70B (no writing action has been performed on the left page 70A), and further only the "save" check box 72A (or "save" check box 72B) has been filled in, it is regarded that the user has had an intention for storing the data on the right page 70B on which he/she has performed the writing action. Thus, only the image data corresponding to the right page 70B is specified as the storage target (save determination pattern 3).

As described above, according to the electronic writing device 2 of the present embodiment includes: a position acquiring portion (Step S2) configured to acquire a plurality of pieces of positional information about the electronic pen 3 that moves along with the writing action performed by the operator on the paper medium 70 using the electronic pen 3; a data creating portion (Step S3) configured to create the image data corresponding to writing on the paper medium 70 with the electronic pen 3 using the plurality of pieces of positional information acquired by the position acquiring portion (Step S2); a communication control portion 207 configured to transmit the image data created by the data creating portion (Step S3) so as to be stored into the server SV via communication; a placing portion 23 (23A, 23B) configured to hold the paper medium 70 including the "save" check box 72 for instructing storage to the server SV in a spread state of the left page 70A on the left side 2A and the right page 70B on the right side 2B of the electronic writing device 2; a writing determining portion (Step S4) configured to determine whether or not the writing action has been performed by the operator on each of the left page 70A and the right page 70B of the paper medium 70 placed on the placing portion 23, based on an acquisition result by the position acquiring portion (Step S2); an entry determining portion (Step S5) configured to determine whether or not the "save" check box 72 included in each page of the paper medium 70 (70A, 70B) placed on the placing portion 23 (23A, 23B) has been filled in, based on the acquisition result by the position acquiring portion (Step S2); an image data specifying portion (Step S6) configured to, in a case where the writing determining portion (Step S4) determines that the writing action has been performed on at least one of the left page 70A and the right page 70B, and further the entry determining portion (Step S5) determines that either one of the "save" check box 72A included in the left page 70A and the "save" check box 72B included in the right page 70B has been filled in, specify the image data (data in the page where the data exists) based on the positional information corresponding to the writing action on at least one page in a unit of one page or two pages in response to an entry mode into either one of the "save" check boxes 72 as a storage target in the server SV; and a transmission control portion (Step S7) configured to control the communication control portion 207 triggered by detection by the entry determining portion (Step S5) of the entry in the "save" check box 72 to perform transmission for storing in the server SV the image data specified by the image data specifying portion (Step S6) as the storage target.

With this configuration, according to the electronic writing device 2 of the present disclosure, the contents written by the user using the electronic pen 3 can be turned into electronic data. In other words, if the user places the paper medium 70 including a predetermined paper medium on the placing portion 23 and performs a desired writing on the paper medium 70 using the electronic pen 3, a plurality of pieces of positional information about the electronic pen 3 that moves by the writing action can be acquired by the position acquiring portion (Step S2). Using the acquired plurality of pieces of positional information, the data creating portion (Step S3) creates the image data corresponding to the writing contents on the paper medium 70. The created image data is transmitted to the server SV by the communication control portion 207, and stored and memorized in the server SV.

At this point, the paper medium 70 can be used in the spread state of the both pages of the left page 70A and the right page 70B. When the paper medium 70 is placed on the placing portion 23A on the left side 2A and the placing portion 23B on the right side 2B, the paper medium 70 is held on the placing portion 23 in the spread state of the left page 70A on the left side 2A and the right page 70B on the right side 2B.

Further, each page of the left page 70A and the right page 70B includes the "save" check box 72 for instructing external storage. The user, after performing the writing in a state where the left page 70A and the right page 70B are held on the placing portions 23A, 23B, respectively, fills in the "save" check box 72 in a predetermined manner to instruct the storage to the storage destination where the created image data is desired to be saved. Then, based on the positional information acquired by the position acquisition portion (Step S2), the entry determining portion (Step S5) determines that the "save" check box 72 has been filled in. Therefore, the transmission control portion (Step S7) controls the communication control portion 207 to transmit the image data via wireless communication. With this processing, the image data corresponding to the writing contents is automatically stored into the server SV (Step S7).

As described above, there can be a case where, on the paper medium 70 in the spread state (state where the both of the left page 70A and the right page 70B are opened), the user does not fill in both the "save" check boxes 72 of the both pages, but filled in only the "save" check box 72 of either one page. In such a case, there may be a case where the user has performed a writing action only on either one page, but a case can be also dealt with where he/she has failed to fill in due to some reasons (e.g., he/she has been in such a hurry that he/she has not filled in the "save" check box 72 of one page or has inadvertently forgotten to fill in), even though he/she has performed the writing action on the both pages.

The present disclosure is not limited to the above-described embodiment. For example, according to the above-described specific example, a case where the order of the writing action from the left page 70A to the right page 70B is considered for description, but, as the writing order may not be considered for example, various types of modifications may be performed within the spirit and technical scope of the disclosure. Such modification examples will be described sequentially below.

(1) <In Case where Data Exists on Both Right and Left Pages>

For example, when the writing determining portion (Step S4) determines that the writing action has been performed on the both pages of the left page 70A and the right page 70B (both writing flags of the both pages are "1"), the CPU 201, in the image data specifying portion (Step S6), (i) specifies the image data corresponding to the left page 70A and the image data corresponding to the right page 70B (data in the page where the data exists) as the storage target separately (save determination pattern 1) in a case where the entry determining portion (Step S5) determines that the "save" check box 72A has been filled in, and (ii) specifies the image data corresponding to the left page 70A and the right page 70B collectively as the storage target (save determination pattern 4) in a case where the entry determining portion (Step S5) determines that only the "save" check box 72B has been filled in.

(2) (In a Case where No Data Exists on Both Right and Left Pages>

When the writing determining portion (Step S4) determines that no writing action has been performed on both the left page 70A and the right page 70B, both in a case where the entry determining portion (Step S5) determines that only the "save" check box 72A has been filled in, and in a case where the entry determining portion (Step S5) determines that only the "save" check box 72B has been filled in, the CPU 201, in the image data specifying portion (Step S6), may not specify the image data corresponding to the left page 70A and the right page 70B as the storage target.

(3) Others

The above-described embodiment is described defining that the left page 70A is the first page (previous page) and the right page 70B is the second page (subsequent page), but, this page order can be applied for, so called, horizontal writing. Therefore, in a case of vertical writing, it is also possible to treat the right page 70B as the first page (previous page), and the left page 70A as the second page (subsequent page).

Further, as described above, the coordinate detection portion 24 detects a magnetic field from the electronic pen 3, and thereby the movement of the electronic pen 3 caused by the user's writing action is detected, but, the present disclosure is not limited thereto. In other words, a method may be adopted in which the movement of the tip end of the electronic pen 3 when the user performs the writing action is detected using an ultrasonic wave, infrared ray, or a camera capturing result. Furthermore, a known pressuresensitive portion is disposed on the placing portion 23 of the electronic writing device 2, and when the user performs the writing action, the movement of the tip end of the electronic pen 3 may be detected by detecting a force of the tip end thereof pressing the paper medium 70. In this case, as the electronic pen 3, a general pen such as a normal ballpoint pen, not a pen including the coil 35 for generating the magnetic field as described above, can be used.

Moreover, as described above, the CPU 201 transmits the corresponding writing letters L, R to the server SV to store them into the folder triggered by checking the "save" check box 72, but, the present disclosure is not limited thereto. For example, the folder may be separated for the left page, for the right page, and for the both pages, and the writing letters L, R may be automatically separated to be stored into the folder corresponding to the page intended by the user depending on the storage destination of the folder. Further, the writing letters L, R may be once stored in the plurality of folders inside the electronic writing device 2. Subsequently, they may be output into the folders in the server SV to be stored therein by triggered by a certain cause. In this case, the plurality of folders where the writing letters L, R are once stored may be provided in a PC terminal, a mobile terminal, or a smart phone that is separately provided outside the electronic writing device 2.

As described above, arrows illustrated in FIG. 2 indicate an example of flows of signals, but do not limit flow directions of the signals.

Furthermore, a flowchart illustrated in FIG. 7 does not limit the present disclosure to a procedure illustrated in the flow, but addition, deletion, or change of orders of the procedure may be performed within an area not departing from the spirit and the technical scope of the disclosure.

Moreover, in addition to examples that are already described above, methods by the above-described embodiments and each modification example may be appropriately combined with each other to be used.

In addition, although each of examples is not described, various modifications are added to the present disclosure to be implemented within a region where the sprit does not depart from the present disclosure.

What is claimed is:

1. An electronic writing device comprising:
    a position acquiring portion configured to acquire a plurality of pieces of positional information of a writing instrument that moves along with a writing action performed by an operator on a medium configured to receive writing by said writing instrument;
    a data creating portion configured to create image data corresponding to writing contents on said medium written with said writing instrument using said plurality of pieces of positional information acquired by said position acquiring portion;
    a communication device configured to transmit said image data created by said data creating portion so as to be stored in an external storage device;
    a holding member configured to hold said medium to be written, said medium to be written including, in each page, a storage instruction entry column for instructing storage in the external storage device, the holding member configured to hold said medium to be written in a spread state with a first page on a first side and a second page on a second side in a horizontal direction;
    a writing determining portion configured to determine whether or not said writing action has been performed by said operator on each of said first page and said second page of said medium to be written held by said holding member, based on an acquisition result by said position acquiring portion;
    an entry determining portion configured to determine whether or not said storage instruction entry column included in each page of said medium to be written held by said holding member has been filled in, based on the acquisition result by said position acquiring portion;
    an image data specifying portion configured to, in a case where said writing determining portion determines that said writing action has been performed on at least one of said first page and said second page, and further said entry determining portion determines that either one of a first storage instruction entry column included in said first page and a second storage instruction entry column included in said second page has been filled in, specify said image data based on said positional information corresponding to said writing action performed on said at least one page in a unit of one page or two pages, depending on which of the storage instruction entry columns or both have been filled in, as a storage target in said external storage device; and
    a transmission control portion configured to control said communication device triggered by said entry determining portion detecting entry in said storage instruction entry column to perform transmission for storing said image data specified by said image data specifying portion as said storage target, in said external storage device,
    wherein the image data specifying portion is configured to, in a case where only one of the first storage instruction entry column and the second storage instruction entry column corresponding to one of the first page and the second page, respectively, has been filled in, determine whether the writing action includes writing on the other of the first page and the second page.

2. The electronic writing device according to claim 1, wherein:
    said image data specifying portion, when said writing determining portion determines that said writing action has been performed on both of said first page and said second page,
    (i) in a case where said entry determining portion determines that said first storage instruction entry column has been filled in, irrespective of whether the second storage instruction entry column has been filled in, specifies said image data corresponding to said first page and said image data corresponding to said second page as separate storage targets, and
    (ii) in a case where said entry determining portion determines that, of the first and second storage instruction entry columns, only said second storage instruction entry column has been filled in, specifies said image data corresponding to said first page and said image data corresponding to said second page are stored together as the storage target.

3. The electronic writing device according to claim 1, wherein
    said image data specifying portion is configured to, in a case where said writing determining portion determines that said writing action has been performed on said first page and said writing action has not been performed on said second page, specify said image data corresponding to said first page as said storage target in each case where said entry determining portion determines that said first storage instruction entry column has been filled in and where said entry determining portion determines that said second storage instruction entry column has been filled in.

4. The electronic writing device according to claim 1, wherein said image data specifying portion is configured to, in a case where said writing determining portion determines that said writing action has been performed on said second page and said writing action has not been performed on said first page, specify said image data corresponding to said second page as said storage target in each case where said entry determining portion determines that said first storage instruction entry column has been filled in and where said entry determining portion determines that said second storage instruction entry column has been filled in.

5. The electronic writing device according to claim 2, wherein said image data specifying portion is configured to, in a case where said writing determining portion determines that said writing action has not been performed on any of said first page and said second page, not specify said image data corresponding to said first page and said second page as said storage target in each case where said entry determining portion determines that said first storage instruction entry column has been filled in and where said entry determining portion determines that said second storage instruction entry column has been filled in.

6. An electronic writing device comprising:

a first side configured to support a first page of a medium;

a second side movable relative to the first side, the second side configured to support a second page of the medium;

a processor; and memory storing computer readable instructions that, when executed, cause the electronic writing device to:

acquire a plurality of pieces of positional information of a writing instrument that moves along with a writing action performed by an operator on the medium supported by the first and second sides, the medium configured to receive writing by said writing instrument;

create image data corresponding to writing contents on said medium written with said writing instrument using said acquired plurality of pieces of positional information;

transmit said created image data so as to be stored in an external storage device;

determine whether or not said writing action has been performed by said operator on each of said first page and said second page of said medium to be written supported by said first and second sides, respectively, based on the acquiring;

determine whether or not a respective storage instruction entry column included in each of the first and second pages of said medium has been filled in based on the acquiring;

in a case where said writing action is determined to have been performed on at least one of said first page and said second page, and either one of a first storage instruction entry column included in said first page and a second storage instruction entry column included in said second page is determined to have been filled in, specify said image data based on said positional information corresponding to said writing action performed on said at least one page in a unit of one page or two pages, depending on which of the first and second storage instruction entry columns or both have been filled in, as a storage target in said external storage device; and control a transmission, triggered by detecting entry in one of said first storage instruction entry column and said second storage instruction entry column, for storing said specified image data as said storage target, in said external storage device, wherein, in a case where only one of the first storage instruction entry column and the second storage instruction entry column corresponding to one of the first page and the second page, respectively, has been filled in, specifying said image data further includes determining whether the writing action includes writing on the other of the first page and the second page.

7. The electronic writing device according to claim 6, wherein the instructions, when executed, cause the electronic writing device to:

in a case where it is determined that said writing action has been performed on both of said first page and said second page, (i) in a case where it is determined that said first storage instruction entry column has been filled in, irrespective of whether the second storage instruction entry column has been filled in, specify said image data corresponding to said first page and said image data corresponding to said second page as separate storage targets, and (ii) in a case where it is determined that, of the first and second storage instruction entry columns, only said second storage instruction entry column has been filled in, specify said image data corresponding to said first page and said image data corresponding to said second page are stored together as the storage target.

8. The electronic writing device according to claim 6, wherein the instructions, when executed, cause the electronic writing device to:

in a case where it is determined that said writing action has been performed on said first page and said writing action has not been performed on said second page, specify said image data corresponding to said first page as said storage target in each case where it is determined that said first storage instruction entry column has been filled in and where it is determined that said second storage instruction entry column has been filled in.

9. The electronic writing device according to claim 6, wherein the instructions, when executed, cause the electronic writing device to:

in a case where it is determined that said writing action has been performed on said second page and said writing action has not been performed on said first page, specify said image data corresponding to said second page as said storage target in each case where it is determined that said first storage instruction entry column has been filled in and where it is determined that said second storage instruction entry column has been filled in.

10. The electronic writing device according to claim 7, wherein the instructions, when executed, cause the electronic writing device to:

in a case where it is determined that said writing action has not been performed on any of said first page and said second page, not specify said image data corresponding to said first page and said second page as said storage target in each case where it is determined that said first storage instruction entry column has been filled in and where it is determined that said second storage instruction entry column has been filled in.

\* \* \* \* \*